(12) United States Patent
Stewart

(10) Patent No.: US 11,414,171 B2
(45) Date of Patent: Aug. 16, 2022

(54) TUBULAR COMPOSITE STRUT HAVING INTERNAL STIFFENING AND METHOD FOR MAKING THE SAME

(71) Applicant: The Boeing Company, Chicago, IL (US)

(72) Inventor: Samuel Ray Stewart, Shelby, MT (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 16/667,669

(22) Filed: Oct. 29, 2019

(65) Prior Publication Data

US 2020/0062369 A1   Feb. 27, 2020

Related U.S. Application Data

(60) Division of application No. 14/500,480, filed on Sep. 29, 2014, now Pat. No. 10,464,656, which is a continuation-in-part of application No. 13/288,491, filed on Nov. 3, 2011, now Pat. No. 8,904,904.

(51) Int. Cl.
| | |
|---|---|
| *B29C 33/48* | (2006.01) |
| *B64C 1/00* | (2006.01) |
| *B29C 53/82* | (2006.01) |
| *B29C 70/86* | (2006.01) |
| *B29C 53/58* | (2006.01) |
| *F16C 7/02* | (2006.01) |
| *B29C 70/38* | (2006.01) |
| *B29L 31/00* | (2006.01) |

(52) U.S. Cl.
CPC .............. *B64C 1/00* (2013.01); *B29C 53/585* (2013.01); *B29C 53/587* (2013.01); *B29C 53/822* (2013.01); *B29C 70/38* (2013.01); *B29C 70/86* (2013.01); *F16C 7/026* (2013.01); *B29L 2031/748* (2013.01); *Y02T 50/40* (2013.01)

(58) Field of Classification Search
CPC ..... B29C 33/485; B29C 33/52; B29C 33/525; B29C 33/54
See application file for complete search history.

(56) References Cited

U.S. PATENT DOCUMENTS

| | | |
|---|---|---|
| 1,930,285 A | 10/1933 | Robinson |
| 2,089,492 A | 8/1937 | Lambert |
| 2,593,714 A | 4/1952 | Robinson |
| 4,014,184 A | 3/1977 | Stark |

(Continued)

FOREIGN PATENT DOCUMENTS

| | | |
|---|---|---|
| DE | 102007015909 A1 | 10/2008 |
| EP | 0267063 A1 | 5/1988 |

(Continued)

OTHER PUBLICATIONS

Canadian Intellectual Property Office Examination Search Report, dated May 29, 2015, regarding Application No. 2,851,824, 3 pages.

(Continued)

*Primary Examiner* — Matthew J Daniels
(74) *Attorney, Agent, or Firm* — Yee & Associates, P.C.

(57) ABSTRACT

A system and method for forming a strut. A strut comprises a laminated composite tube having a substantially hollow interior and a pair of longitudinal stiffeners attached to opposite sides of the laminated composite tube.

21 Claims, 14 Drawing Sheets

(56) References Cited

U.S. PATENT DOCUMENTS

| | | |
|---|---|---|
| 4,144,686 A | 3/1979 | Gold |
| 4,238,540 A | 12/1980 | Presta et al. |
| 4,272,971 A | 6/1981 | Loyd et al. |
| 4,275,122 A | 6/1981 | Fisher |
| 4,411,114 A | 10/1983 | Wurtinger et al. |
| 4,469,730 A | 9/1984 | Burhans et al. |
| 4,679,600 A | 7/1987 | Dougherty |
| 4,851,065 A | 7/1989 | Curtz |
| 4,968,545 A | 11/1990 | Fellman et al. |
| 5,203,435 A | 4/1993 | Dolgin |
| 5,244,619 A | 9/1993 | Burnham |
| 5,279,368 A | 1/1994 | Arnott |
| 5,511,604 A | 4/1996 | Ravenhall et al. |
| 5,571,357 A | 11/1996 | Darrieux et al. |
| 6,114,050 A | 9/2000 | Westre et al. |
| 6,425,836 B1 | 7/2002 | Misono et al. |
| 6,510,961 B1 * | 1/2003 | Head .............. B29C 53/587 244/119 |
| 6,586,110 B1 | 7/2003 | Obeshaw |
| 6,711,783 B2 | 3/2004 | LeMole |
| 6,821,638 B2 | 11/2004 | Obeshaw |
| 6,949,282 B2 | 9/2005 | Obeshaw |
| 7,143,510 B2 | 12/2006 | Myers et al. |
| 7,452,156 B2 | 11/2008 | Kennedy |
| 7,854,241 B2 | 12/2010 | Chenin et al. |
| 8,118,064 B2 | 2/2012 | Nakajima et al. |
| 8,123,996 B2 | 2/2012 | Booker et al. |
| 8,365,502 B2 | 2/2013 | Allen et al. |
| 8,414,724 B2 | 4/2013 | Schnelz |
| 8,904,904 B2 | 12/2014 | Stewart |
| 9,486,965 B2 | 11/2016 | Stewart |
| 2002/0006523 A1 | 1/2002 | Obeshaw |
| 2003/0086752 A1 | 5/2003 | Lemole |
| 2003/0146346 A1 * | 8/2003 | Chapman, Jr. .......... B29C 65/56 244/123.3 |
| 2004/0089976 A1 * | 5/2004 | Bradley ............... B29C 70/446 425/111 |
| 2004/0148776 A1 * | 8/2004 | Myers .................... F16C 3/026 29/888.1 |
| 2005/0044984 A1 | 3/2005 | Jones et al. |
| 2007/0007386 A1 | 1/2007 | Coupe et al. |
| 2007/0022800 A1 | 2/2007 | Zifferer et al. |
| 2008/0119296 A1 | 5/2008 | Kennedy |
| 2008/0129041 A1 * | 6/2008 | Allen ....................... E04C 3/36 285/55 |
| 2008/0131630 A1 | 6/2008 | Schnelz |
| 2009/0202767 A1 | 8/2009 | Booker et al. |
| 2009/0217529 A1 * | 9/2009 | Cerezo ................... B64C 1/068 29/897.2 |
| 2010/0196637 A1 | 8/2010 | Lippert et al. |
| 2010/0266790 A1 | 10/2010 | Kusinski et al. |
| 2011/0011008 A1 | 1/2011 | Dagher et al. |
| 2011/0073708 A1 | 3/2011 | Bironstad |
| 2011/0168324 A1 * | 7/2011 | Ender .................. B29C 70/543 156/243 |
| 2011/0281082 A1 * | 11/2011 | Wilson ............... B29C 66/7212 428/178 |
| 2012/0312922 A1 | 12/2012 | Rosman |
| 2013/0101762 A1 | 4/2013 | Malis et al. |
| 2013/0112309 A1 | 5/2013 | Stewart |
| 2013/0156979 A1 | 6/2013 | Stewart |
| 2015/0013819 A1 | 1/2015 | Stewart |
| 2017/0050405 A1 | 2/2017 | Stewart |

FOREIGN PATENT DOCUMENTS

| | | |
|---|---|---|
| FR | 2540430 A3 | 8/1984 |
| FR | 2890591 A1 | 3/2007 |
| FR | 2957843 A1 | 9/2011 |
| GB | 2215008 A | 9/1989 |
| JP | S55159312 A | 12/1980 |
| JP | S61261035 A | 11/1986 |
| JP | 2008301742 A | 12/2008 |
| WO | 02057573 A | 7/2002 |
| WO | 2008066606 A1 | 6/2008 |
| WO | 2009138660 A1 | 11/2009 |
| WO | 2012085229 A1 | 6/2012 |

OTHER PUBLICATIONS

Office Action dated Jul. 8, 2016, regarding Chinese Patent Application No. 201280053017.2, 7 pages. (English translation not available).

State Intellectual Property Office of PRC Notification of Third Office Action and English Translation, dated Jan. 23, 2017, regarding Application No. 201280053017.2, 20 pages.

Takatoya et al., "Compression After Impact Properties of Hybrid Composite Materials," 16th International Conference on Composite Materials, Jul. 2007, pp. 1-5.

Office Action, dated Jan. 3, 2014, regarding U.S. Appl. No. 13/288,491, 30 pages.

Final Office Action, dated Apr. 15, 2014, regarding U.S. Appl. No. 13/288,491, 9 pages.

Notice of Allowance, dated Aug. 6, 2014, regarding U.S. Appl. No. 13/288,491, 5 pages.

Office Action, dated Apr. 25, 2013, regarding U.S. Appl. No. 13/326,005, 19 pages.

Final Office Action, dated Aug. 22, 2013, regarding U.S. Appl. No. 13/326,005, 23 pages.

Office Action, dated Jul. 21, 2014, regarding U.S. Appl. No. 13/326,005, 21 pages.

Office Action, dated Feb. 11, 2016, regarding U.S. Appl. No. 14/500,480, 26 pages.

Final Office Action, dated Aug. 25, 2016, regarding U.S. Appl. No. 14/500,480, 10 pages.

Office Action, dated Aug. 10, 2017, regarding U.S. Appl. No. 14/500,480, 13 pages.

Final Office Action, dated Mar. 5, 2018, regarding U.S. Appl. No. 14/500,480, 10 pages.

Office Action dated Oct. 26, 2018, regarding U.S. Appl. No. 15/344,885, 32 pages.

* cited by examiner

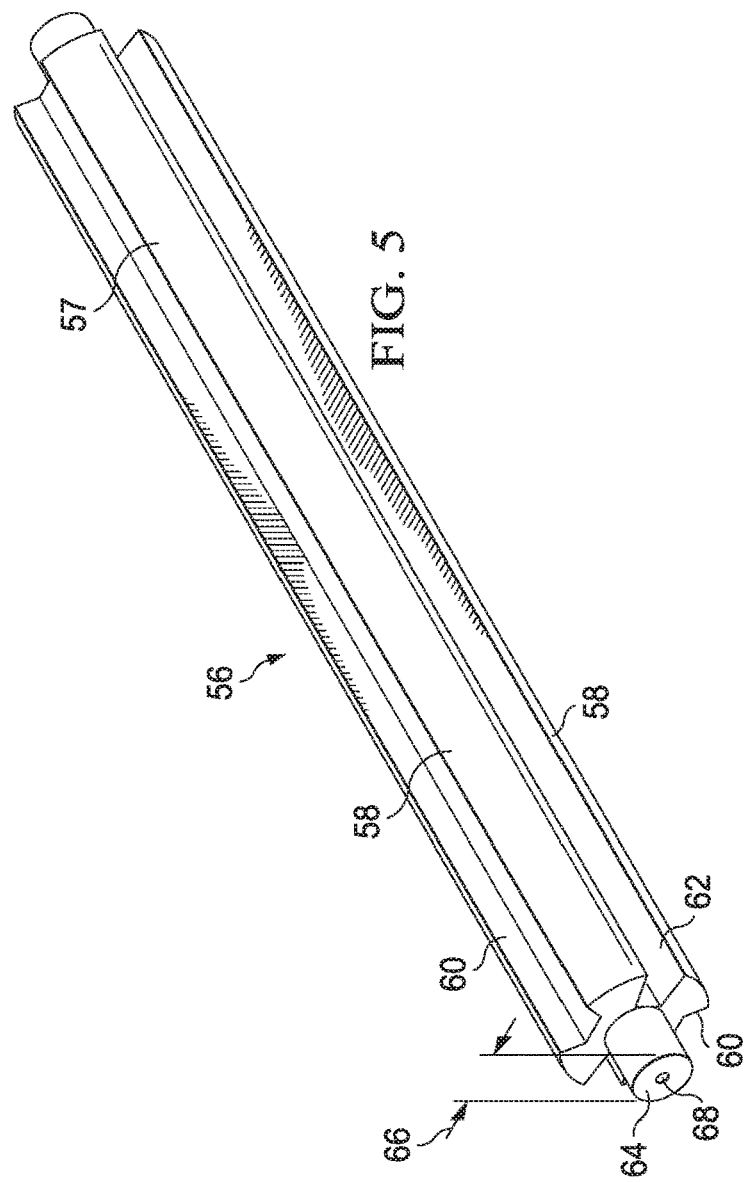
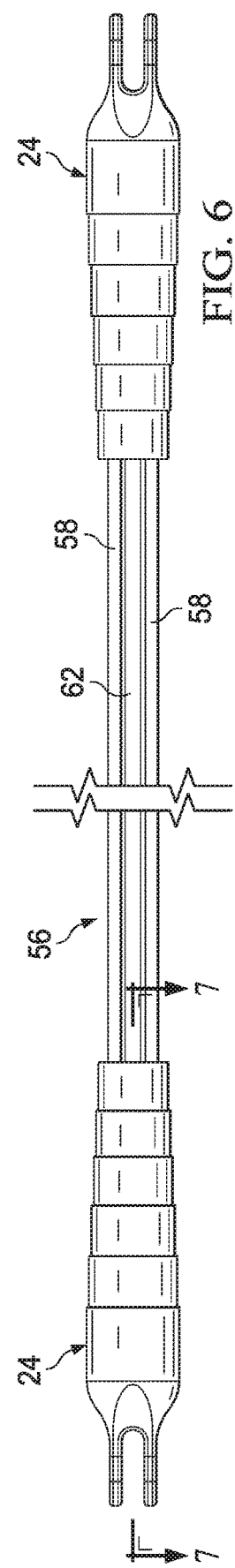

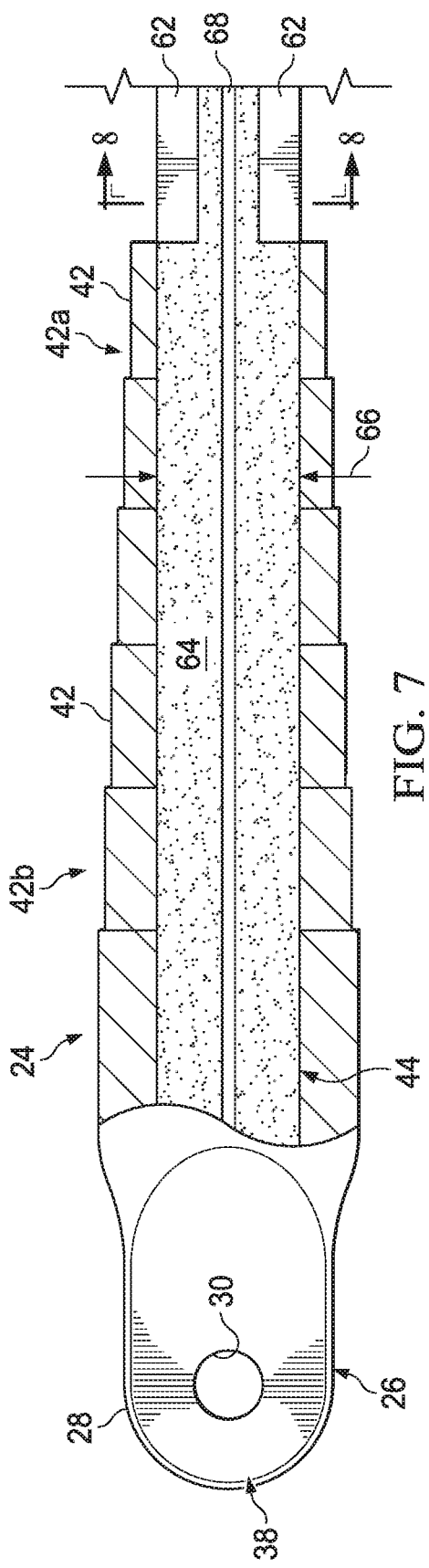
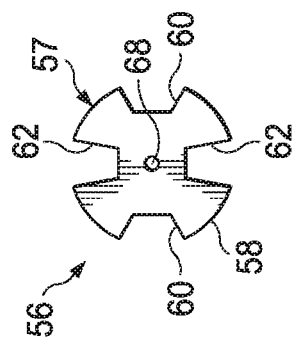
FIG. 7
FIG. 8

TUBULAR COMPOSITE STRUT HAVING INTERNAL STIFFENING AND METHOD FOR MAKING THE SAME

CROSS REFERENCE TO RELATED APPLICATIONS

This application is a divisional application of U.S. application Ser. No. 14/500,480 filed Sep. 29, 2014, currently patented as U.S. Pat. No. 10,464,656, which is a continuation-in-part application of U.S. patent application Ser. No. 13/288,491, filed on Nov. 3, 2011, currently patented as U.S. Pat. No. 8,904,904, the entire disclosure of which is incorporated by reference herein.

BACKGROUND INFORMATION

1. Field

The present disclosure generally relates to composite columnar structures, and deals more particularly with a composite tubular strut internally stiffened to maximize the strut's strength-to-weight ratio.

2. Background

Columnar structures formed of composites are used in a variety of applications because of their favorable strength to weight ratio. For example, composite tubular struts may be used in the aerospace industry as a support or brace for transferring loads in either direction along the longitudinal axis of the strut, thus placing the strut in either compression or tension. Fittings on the ends of the strut provide additional strength at the points of attachment of the strut to a structure.

Composite struts are known in which the end fittings, often fabricated from metal, are attached to a tubular composite body by bonds rather than by fasteners. The tubular bodies have a substantially constant cross section and a relatively thick wall in order to meet design load criteria. The fittings may be attached to the ends of the tubular body by double step joints which may result in greater than desired peel forces being applied to inner and outer plies of the tube wall. Fabrication of these types of composite struts is both labor intensive and time consuming because of the need for precise hand layup of plies, as well as the need for two autoclave cure cycles for separately curing the inner and outer plies of the joint.

Accordingly, there is a need for a tubular composite strut that may be more quickly fabricated and using less skilled hand labor. There is also a need for a composite strut as described above which has an improved strength-to-weight ratio.

SUMMARY

The disclosed embodiments provide a tubular composite strut and related fabrication method that optimize of the structural strength-to-ratio of the strut through the use of a tailored cross sectional tube configuration that employs internal stiffeners co-cured with the tube body, as well as the ability to tailor skin thickness. The strut is fabricated using an internal mandrel that allows layup of the internal stiffeners engineered to result in an idealized moment of inertia value and maximize strut performance. The internal mandrel allows use of an automatic fiber placement machine to layup plies of the tube body and the stiffeners, which may reduce the need for an autoclave cure cycle to achieve a desired compaction. The tube body is bonded to the end fittings using a step joint with a single side bond. The internal stiffeners may be positioned and engineered to resist bending forces depending on the plane of loading from attachment, thereby allowing a reduction of the thickness of the tube body wall.

According to one disclosed embodiment, a strut is provided comprising a laminated composite tubular body having a substantial hollow interior. At least one pair of stiffeners extends longitudinally through the interior of and is attached to opposite sides of the tubular body. The tube body may include end fittings adapted to attach the strut to a structure. In some examples, the fittings may include an opening having a central axis and adapted to receive an elongate pin connecting the fitting to the structure. Each of the stiffeners is substantially symmetric about a plane extending perpendicular to the axis of the pin. Each of the fittings may include a pair of plurality of outer steps, and the tubular body may include groups of plies respectively overlapping and bonded to the steps. The strut may further comprise a single shear joint between each of the fittings and a corresponding end of the tubular body. Each of the stiffeners may be a laminated composite co-cured with the tubular body.

According to another embodiment, a strut is provided for transferring loads in compression or tension. The strut comprises an elongate tubular body having a wall formed of multiple laminated composite plies, and end fittings adapted to attach the tubular body to a structure. The tubular body may be attached to the structure using a pin. The strut may further comprise a single shear bonded joint between each of the fittings and the tubular body, and composite stiffeners within the tubular body attached to the wall for stiffening the body. Each of the end fittings transfers loads to the tubular body about the longitudinal axis of the corresponding pin. The composite stiffeners include at least a first pair of opposing stiffeners aligned along an axis substantially perpendicular to the pin axes.

According to still another embodiment, a method is provided for making a strut. The method comprises locating composite stiffener layups in cavities of an elongate mandrel, and forming a tubular composite body by laying up composite plies on the mandrel overlying the stiffener layups. In some examples, fittings may be placed onto the mandrel prior to locating composite stiffener layups in the cavities. In these examples, the composite plies of the tubular composite body may also overlay the fittings. The method further comprises cocuring the tubular body and the stiffeners and removing the mandrel. In some examples, the method may further comprise fabricating an elongate mandrel, including forming cavities in the mandrel along its length. Forming the mandrel may include forming an axle on each end of the mandrel, and placing the fittings on the mandrel is performed by placing the fittings on the axles. The stiffeners may be formed offline and placed into the mandrel as a completed part layup. In other words, locating the stiffener layups in the mandrel cavities may include laying up and forming the stiffeners, and placing the formed stiffener layups in the cavities. In other examples, locating the stiffener layups in the mandrel cavities may include using an automatic fiber placement machine to lay down and compact strips of composite tape within the cavities. Forming the tubular body may be performed using an automatic fiber placement machine to lay down and compact strips of composite tape on the surface of the mandrel. Forming the tubular composite body may include forming a single shear joint between the tubular body and each of the fittings.

Removing the mandrel may include dissolving the mandrel with a liquid. The method may further comprise inserting stiffener mandrels within the stiffener layups, and removing the stiffener mandrels after the tubular body and the stiffeners have been co-cured.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is an illustration of a perspective view of a mandrel used to fabricate the strut shown in FIG. 1.

FIG. 6 is an illustration of a top view of the mandrel shown in FIG. 5, with the strut end fittings having been attached to the mandrel axles.

FIG. 7 is an illustration of a sectional view taken along the line 7-7 in FIG. 6.

FIG. 8 is an illustration of a sectional view taken along the line 8-8 in FIG. 7.

DETAILED DESCRIPTION

Figure 1:
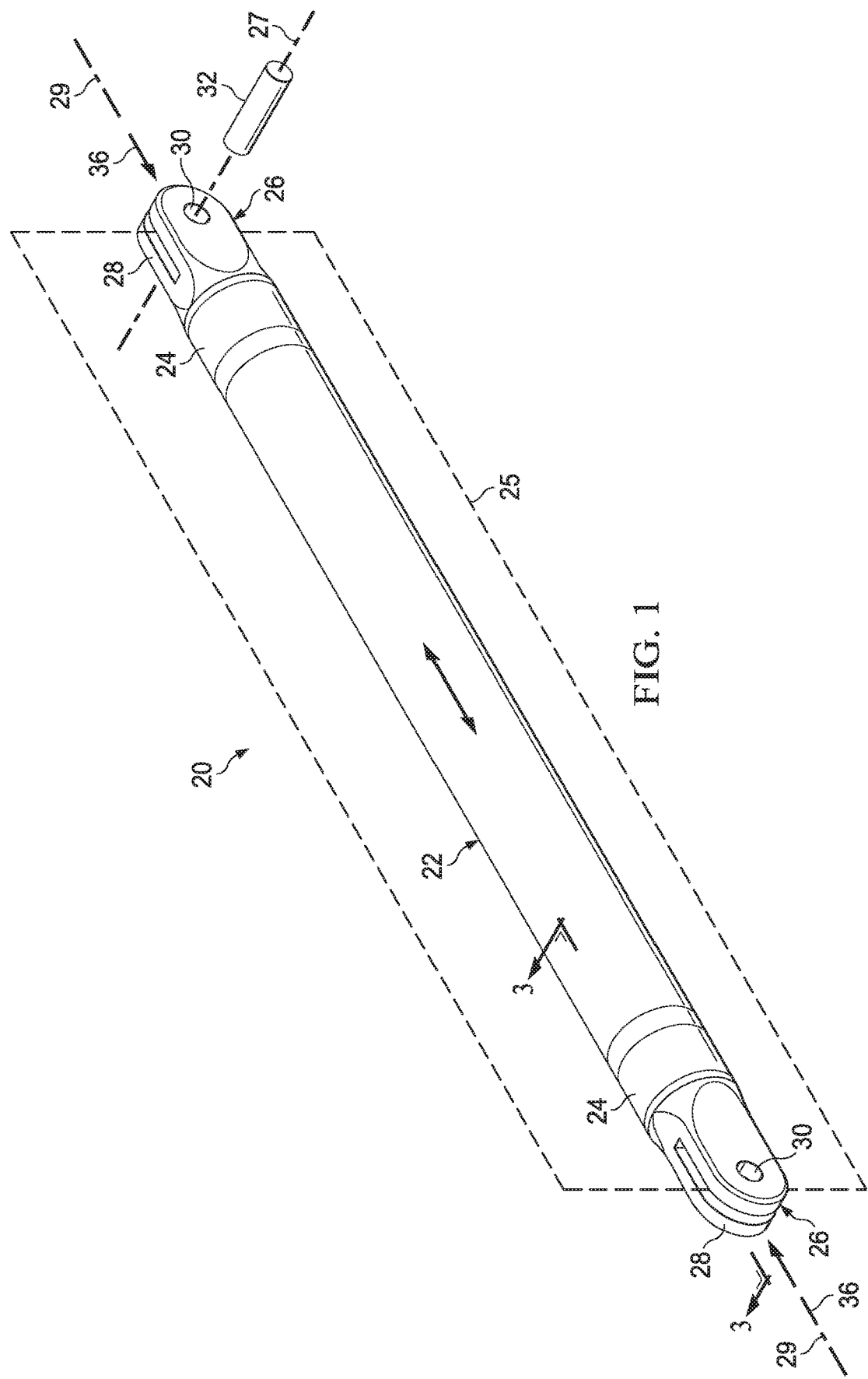
FIG. 1 is an illustration of a perspective view of a composite strut according to the disclosed embodiments.

Referring first to FIG. 1, a columnar structural member in the form of an elongate strut 20 comprises a generally cylindrical tube 22 and a pair of end fittings 24 bonded on opposite ends of the tube 22. The tube 22 may comprise, but is not limited to a composite material, such as multiple laminated plies of a fiber reinforced polymer resin, including but not limited to carbon fiber reinforced epoxy. In the illustrated example, the cross sectional shape of the tube body 22 is substantially round, however other cross sectional shapes are possible such as, without limitation, square, triangular, hexagonal and pentagonal shapes.

Each of the end fittings 24 may be, but is not limited to a metal such as aluminum or titanium, or a composite. The end fittings 24 may be fabricated by casting, machining or other common manufacturing techniques. Where the end fittings 24 are formed of composite materials, they may include metallic inserts and/or metallic bushings (not shown). Each of the end fittings includes clevis 26 comprising a pair of spaced apart tabs 28 respectively having an opening aligned along an axis 27 for receiving an attachment pin 32, without limitation shown as cylindrical, which connects the fitting 24 to a structure (not shown). While shown as a double tab 28 clevis 26, more or less than two tabs 28 may be employed, depending on the application. The pins 32, along with the end fittings 24, form pivotal connections between the strut 20 and the structure (not shown) to which it is attached. Strut 20 may be employed, for example and without limitation, as a brace between an aircraft engine (not shown), and an airframe (not shown). Depending upon the application, the strut 20 may function to transfer axial loads bi-directionally so that the strut 20 may be either placed in tension or compression, or both in an alternating fashion, along its central axis 29. The strut 20 may also experience limited torsional loading.

Figure 2:
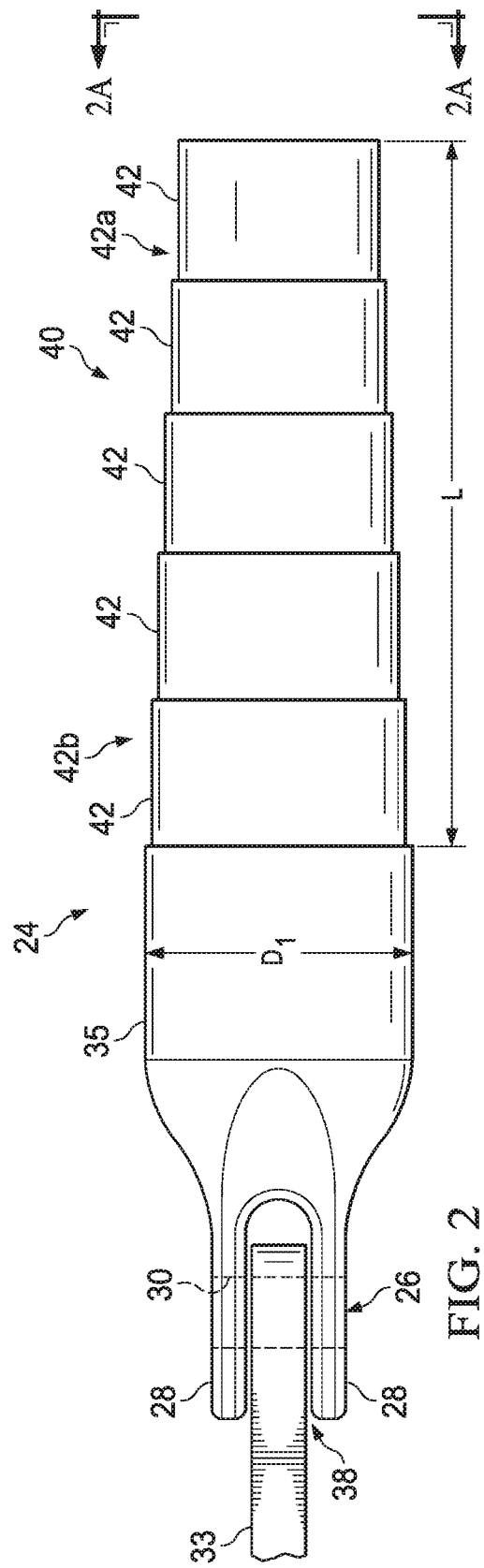
FIG. 2 is an illustration of a top view of one of the end fittings of the strut shown in FIG. 1.
Figure 2A:
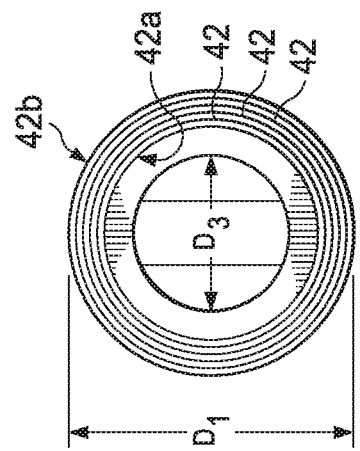
FIG. 2A is an illustration of a side view in the direction shown as 2A-2A in FIG. 2.
Figure 3:
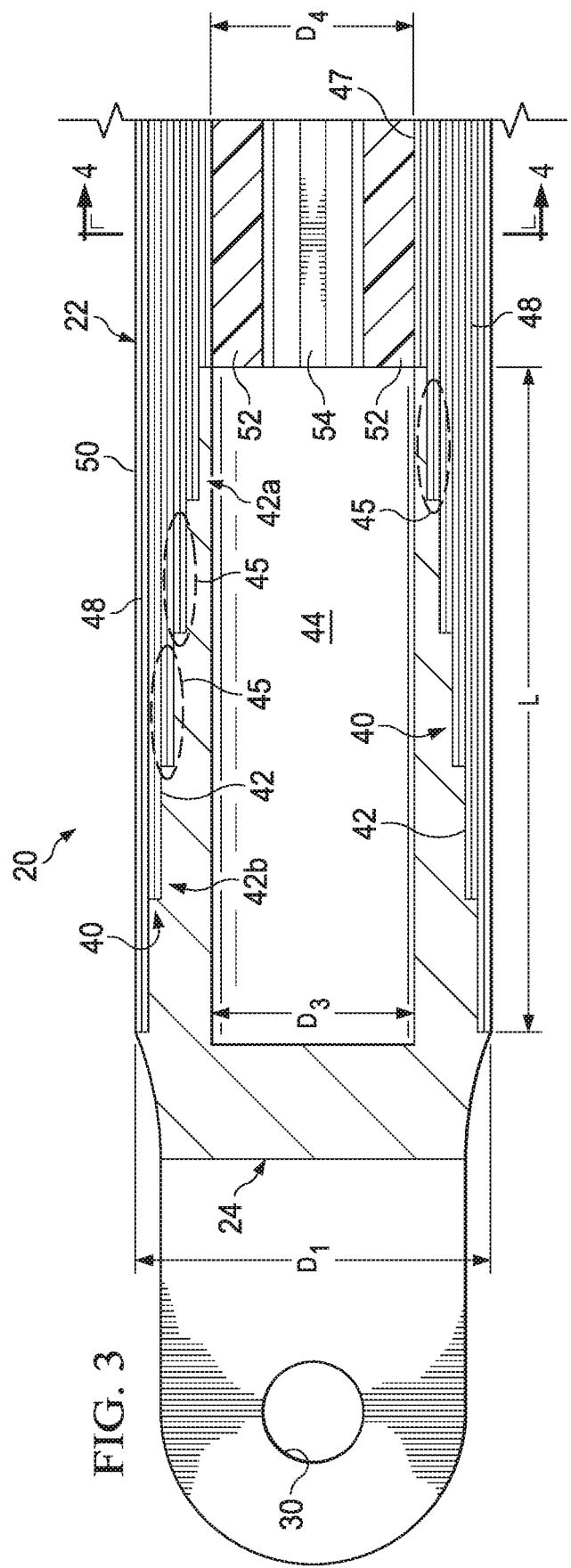
FIG. 3 is an illustration of a cross sectional view taken along the line 3-3 in FIG. 1.
Figure 4:
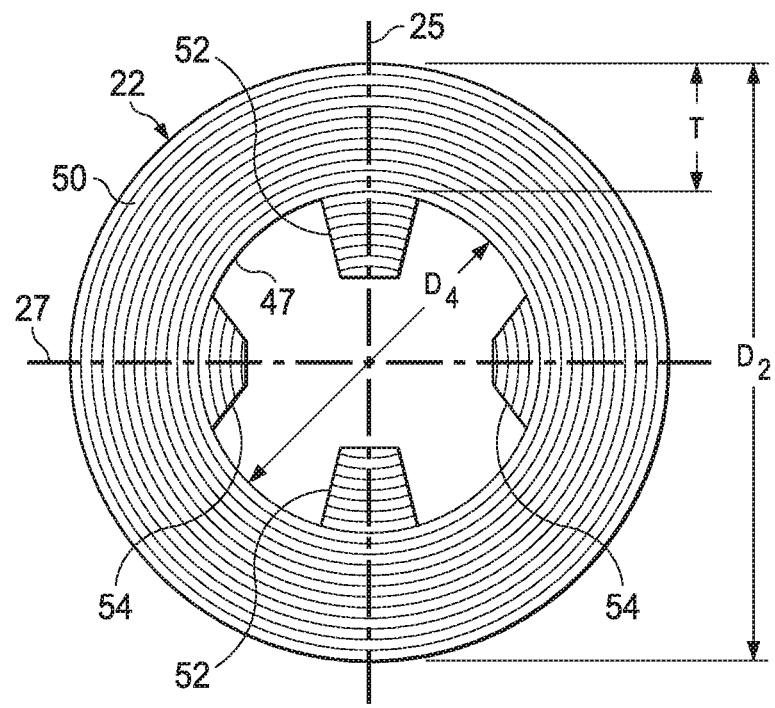
FIG. 4 is an illustration of a sectional view taken along the line 4-4 in FIG. 3.

Referring now to FIGS. 2, 3 and 4, each of the fittings 24 includes a cylindrical section 35 having an outer diameter $D_1$ (FIG. 2) that is substantially equal to outer diameter $D_2$ (FIG. 4) of the tube body 22. The end fittings 24 also include a scalloped section 40 of length L formed by a series of cylindrical steps 42 of progressively smaller diameter. Increasing the length L appropriately for the application assists in dispersing the "stiffness" associated with the intersection of a metal fitting 24 and with the composite tube 22. In other words, increasing the length L of the scalloped section 40 disperses the load transferred between the end fitting 24 and the tube 22 over a larger area. The interior of each fitting 24 may be substantially hollow, defined by a longitudinally extending smooth bore 44 having a diameter $D_3$ that extends through the length of the fitting 24. In the illustrated embodiment, the diameter $D_3$ of the bore 44 is substantially equal to the interior diameter $D_4$ of the tube 22 in order to maximize the contact area, and thus the load transfer capability, between the fitting 24 and the tube 22.

However, in other embodiments the diameter $D_3$ of the bore 44 may be different than the interior diameter $D_4$ of the tube 22. As shown in FIG. 2, the tabs 28 are spaced apart at 38 to receive a tab 33 on a structure (not shown) to which the strut is to be attached. Although not shown in FIG. 2, the attachment pin 32 (FIG. 1) passes through each of the tabs 28, 33.

Tube body 22 comprises a plurality of stepped groups 45 of composite plies 48 which may be formed from prepreg fiber reinforced tape applied, for example and without limitation, by an automatic fiber placement (AFP) machine (not shown). However, the use of other types of composite materials such as, without limitation, metallics and ceramics, and other types of fabrication techniques may be possible. The stepped ply groups 45 are sequentially laid up over the steps 42 of the end fittings 24, beginning with ply layup on the innermost step 42a, and ending with ply layup on the outermost step 42b. The stepped ply groups 45 respectively overlap the steps 42 to form a single stepped shear joint extending along the length L the scalloped section 40 of the fitting 24. In other embodiments it may be possible to employ a scarf joint (not shown) between the tube 22 and the fitting 24, which comprises multiples scarfs with the same or varying slopes The wall 50 of the tube body 22 has a thickness t (FIG. 4). In the illustrated embodiment, the stepped ply groups 45 form a female tube end in which the male fitting 24 is received, however in other embodiments the stepped ply groups 45 may form a male end of the tube 22, and the steps 42 of the fitting 24 may be formed on the interior diameter $D_3$ of the bore 44 which receives the male end of the tube 22.

Referring now particularly to FIGS. 3 and 4, in one embodiment, the tube 22 may be internally stiffened by two pairs of elongate composite stiffeners 52, 54, respectively. The first pair of stiffeners 52 are located diametrically opposite each other (FIG. 4) on the interior surface 47 of the tube wall 50, and are generally symmetrically aligned along axis 25 extending substantially orthogonal to the axis 27 of the pin 30. The second pair of stiffeners 54 are also located diametrically opposite each other, and generally symmetrically aligned along the axis 27 of the pin 30. In the illustrated example, each of the stiffeners 52, 54 is substantially trapezoidal in cross sectional shape, however other cross sectional shapes are possible. Each of the stiffeners 52 has a larger cross sectional area than stiffeners 54 in order to provide the tube 22 with greater resistance to bending about the pin axes 27. In one embodiment, one or both of the stiffeners 52, 54 has a cross sectional shape that is substantially constant along the length of the stiffener 52, 54. However, in other embodiments, the cross section of any of any of the stiffeners 52, 54 may vary in shape or area, either linearly or non-linearly along the length of the stiffener 52, 54. In some embodiments, the stiffeners 52, 54 may be bonded to the tube 22 after the tube 22 is cured.

Figure 4A:
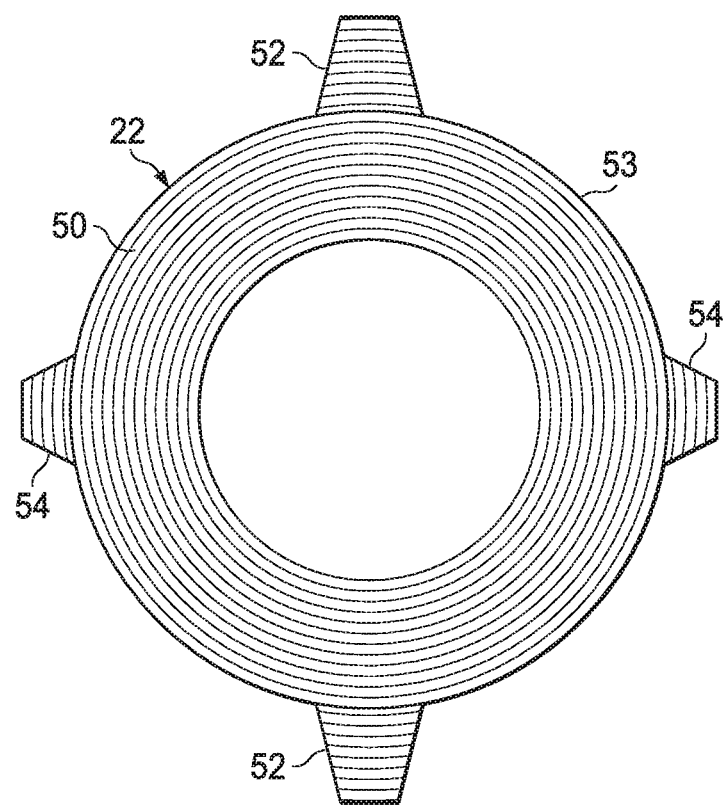
FIGS. 4A-4C are illustrations similar to FIG. 4A but respectively showing alternate embodiments of the composite strut.
Figure 4B:
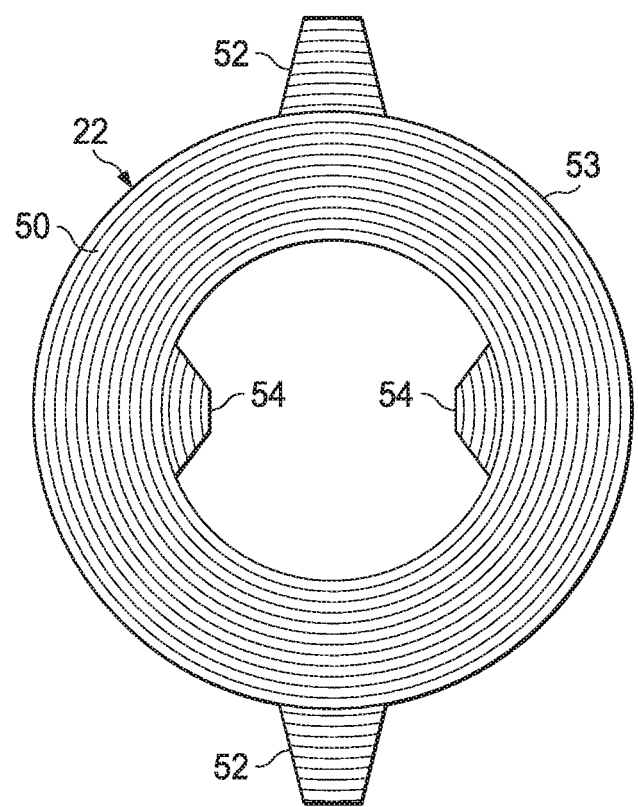
Figure 4C:
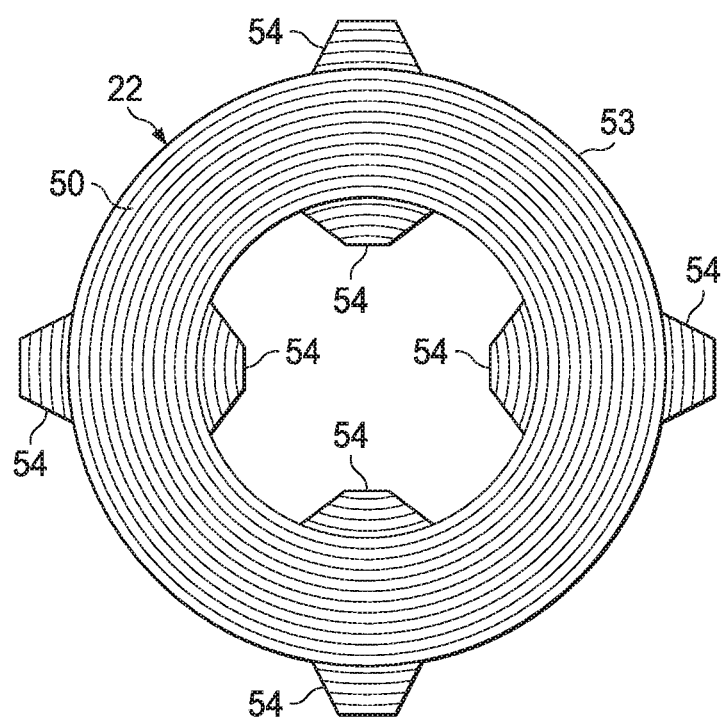

While the embodiment shown in FIGS. 3 and 4 employs stiffeners 54 located inside surface 47 the tube 22, other stiffening arrangements are possible. For example, FIG. 4A illustrates composite stiffeners 52, 54 that are located on the exterior surface 53 of the tube 22, while FIG. 4B illustrates stiffeners 52, 54 that are respectively located on the exterior surface 53 and the interior surface 47 of the tube 22. FIG. 4C illustrates still another embodiment in which stiffeners 54 located on both the interior and exterior surfaces 47, 53 respectively of the tube 22.

Attention is now directed to FIG. 5 which illustrates an internal mandrel 56 that may be used to fabricate the strut 20 previously described. The mandrel 56 includes a generally cylindrical body 57 having a generally cylindrical outer mandrel surface 58. The mandrel body 57 also includes four circumferentially spaced, longitudinal cavities 62 therein, each having a cross sectional shape substantially corresponding to the cross sectional shapes of one of the stiffeners 52, 54. The mandrel 56 further comprises a pair of generally cylindrical axles 64 on the opposite ends thereof which may formed integral with the mandrel body 57. Each of the axles 64 has a diameter 66 substantially corresponding to the interior diameter $D_3$ of the bore 44 in the fittings 24 (FIG. 3). A centrally located through-hole 68 extends axially through the body 57 for purposes of which will be discussed later in more detail.

The mandrel 56 may be formed from a commercially available material that may be dissolved away when subjected to a suitable liquid such as water at a later stage of the fabrication process. In one embodiment, a suitable powdered material is mixed with water and poured or injected into a mold (not shown) in order to form the features of the mandrel 56. Following molding, the mandrel is cured, dried using a suitable heat source such as a convection oven and then sealed, as required. Alternatively, a water soluble mandrel 56 may be fabricated using additive manufacturing processes. In another embodiment, the mandrel 56 may be fabricated from a block of material using suitable material removable processes. In still other embodiments, the mandrel 56 may be formed of a material that is incinerated when elevated to a predetermined temperature, or may comprise an inflatable bladder that is deflated and removed from the tube body 22 after the fabrication process is complete. In still other embodiments, the mandrel 56 may be disassembled and removed in pieces after the tube 22 is cured.

Referring now to FIGS. 6 and 7, after the mandrel 56 has been fabricated, the end fittings 24 are sleeved over the axles 64. As can be seen in embodiment illustrated in FIG. 7, each of the axles 64 substantially completely fills the diameter $D_3$ of the bore 44 (FIG. 3) of the corresponding end fitting 24. In other embodiments, the axle 64 may extend only partially though the length L (FIG. 3) of the bore 43.

Figure 9:
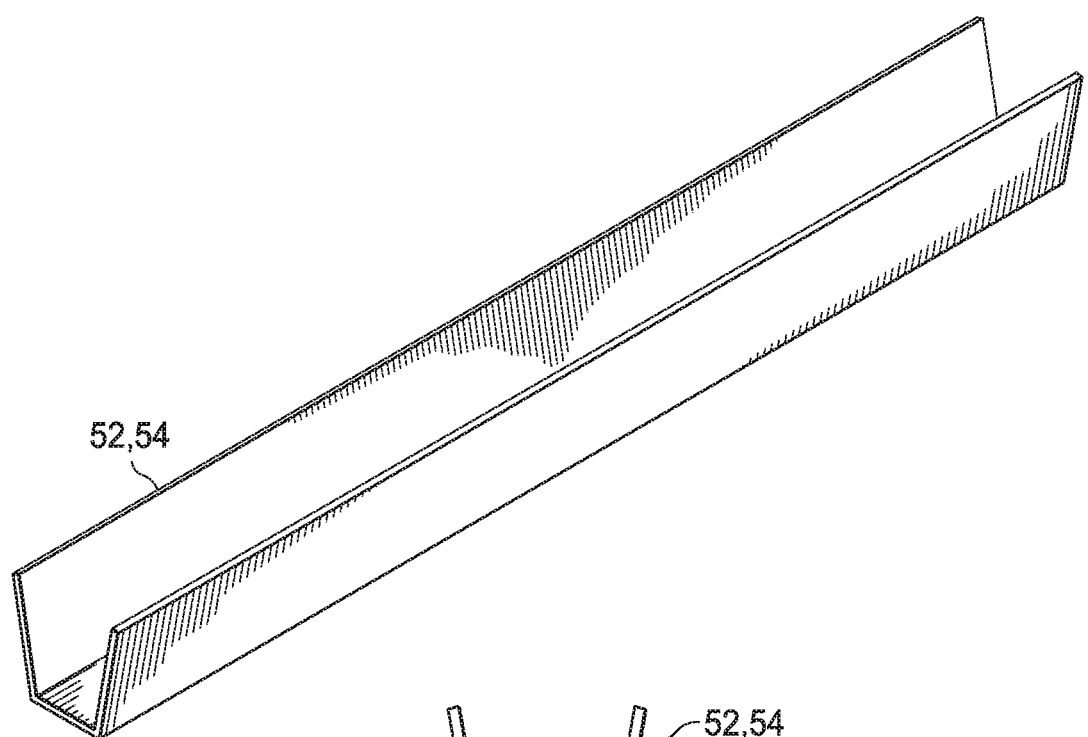
FIG. 9 is an illustration of a perspective view of a stiffener layup.
Figure 10:
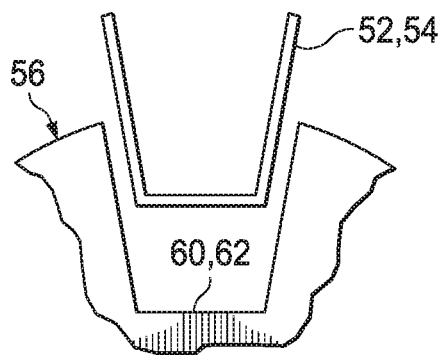
FIG. 10 is an illustration of a cross sectional, end view showing the stiffener shown in FIG. 9 being placed in one of the mandrel cavities.
Figure 11:
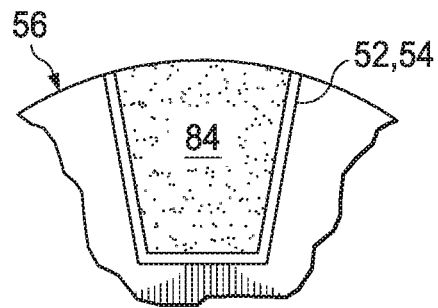
FIG. 11 is an illustration similar to FIG. 10 but showing the stiffener having been fully installed in the cavity and a mandrel having been installed within the stiffener.

Referring now to FIGS. 8 and 9, in one embodiment, the stiffeners 52, 54 may be laid up and formed to shape using separate tooling (not shown) using conventional layup and consolidation processes. Then, as shown in FIG. 10, the formed stiffener layup 52, 54 may be inserted into the corresponding mandrel cavities 60, 62. Alternatively, however, automated equipment such as an AFP machine may be employed to directly layup the stiffener 52 within the cavity 62 by laying down strips (not shown) of fiber reinforced prepreg tape within the cavities 60, 62 and compacting the strips against the mandrel 56. Referring to FIG. 11, after the stiffener layups 52, 54 have been located within the cavity 62, suitable stiffener mandrels 84, which may comprise either a dissolvable solid material or inflatable bladders, are placed inside the stiffener 52 in order to maintain the shape of the stiffener 52 and prevent it from collapsing during subsequent fabrication steps.

Figure 12:
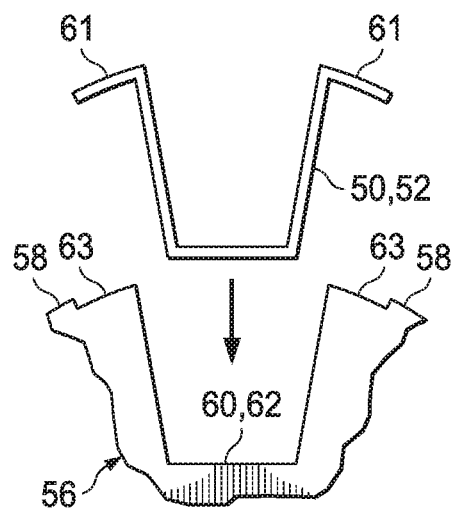
FIG. 12 is an illustration similar to FIG. 10, but showing an alternate embodiment of the stiffener being placed in a modified form of one of the mandrel cavities.
Figure 13:
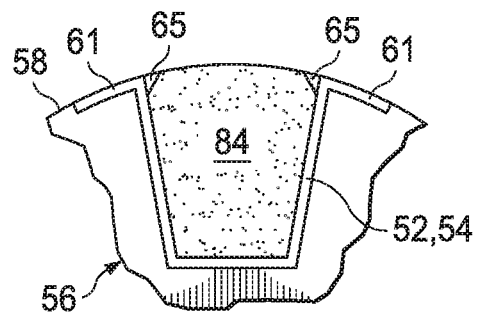
FIG. 13 is an illustration similar to FIG. 12 but showing the stiffener having been fully installed in the cavity and a mandrel along with radius fillers having been installed.
Figure 14:
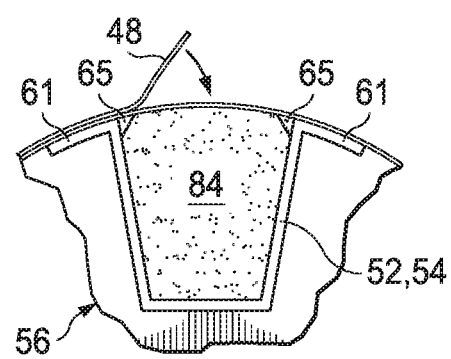
FIG. 14 is an illustration similar to FIG. 13, but showing strips of composite tape being laid up over the mandrel, covering the stiffener and stiffener mandrel.

One or more of the stiffeners 52, 54 may include features that may improve the structural connection between the stiffener 52, 54 and the tube 22. For example, referring to FIG. 12, the stiffeners 52, 54 may include integrated lateral flanges 61 that are respectively received within recesses 63 formed in the surface 58 of the mandrel 56, adjacent the cavities 60, 62. As show in FIG. 13, when the stiffeners 52, 54 are placed in the mandrel cavities 60, 62, the flanges 61 lie substantially flush with the mandrel surface 58. Radius filler 65 may be installed between the stiffener mandrel 84 and the flanges 61 to aid in preventing the flanges 61 from collapsing inwardly during subsequent compaction and curing phases. Next, as shown in FIG. 14, composite plies 48 forming the ply groups 45 (FIG. 3) are laid up over the mandrel 56, covering the flanges 61 and the scalloped section 40 (FIG. 3) of the end fittings 24. During this layup process, the stiffener mandrels 84 support the plies 48 and react the ply compaction forces applied in those applications where an AFP machine is used to perform the layup process.

Figure 15:
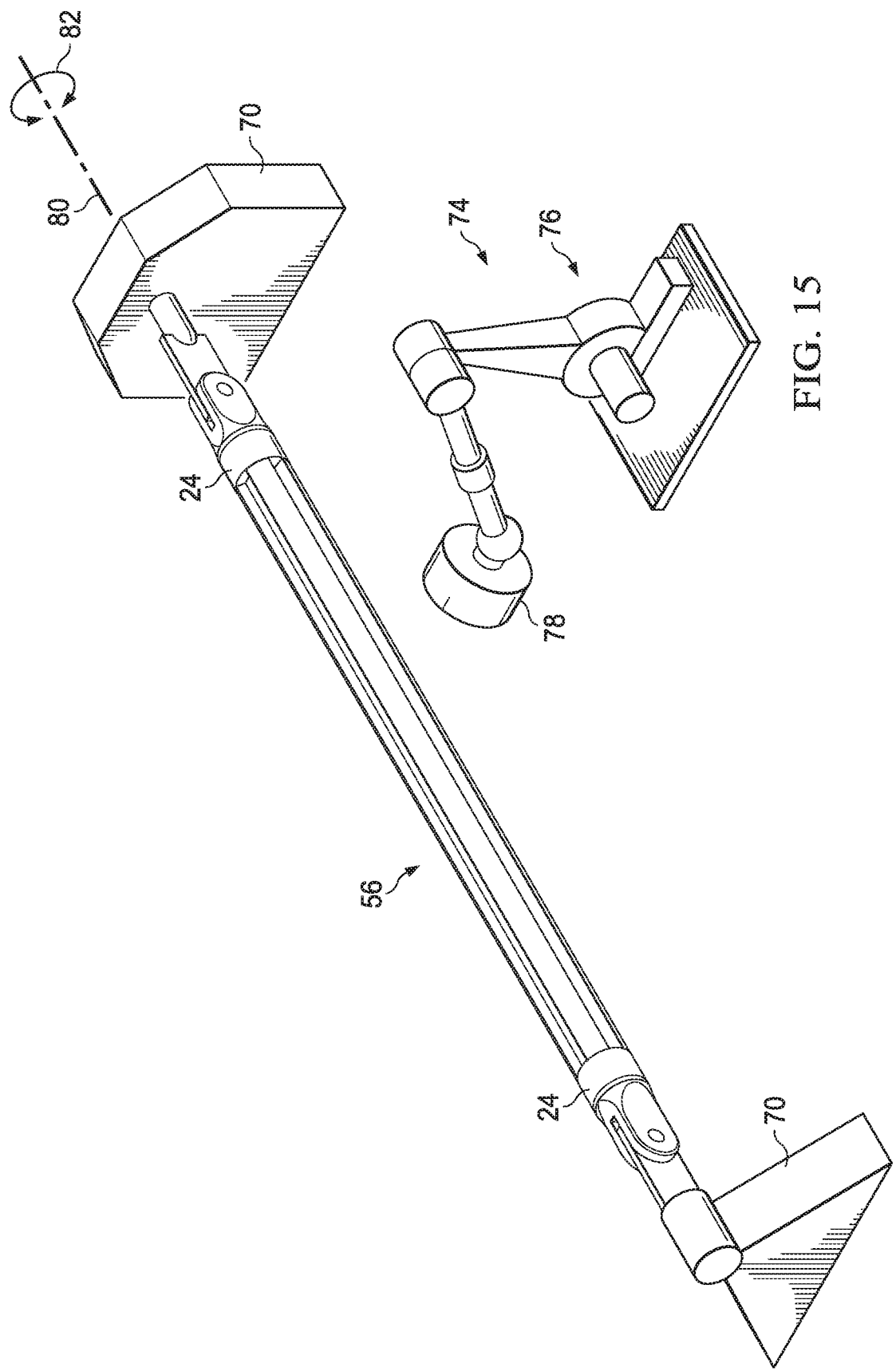
FIG. 15 is an illustration is a perspective view of an automatic fiber placement machine applying composite tape to the mandrel assembly shown in FIG. 6.

FIG. 15 illustrates the use of an AFP machine 74 to layup either the stiffeners 52, 54 and/or the plies 48 forming the wall 50 of the tube 22. The AFP machine 74 may be any of several different suitable types which include a composite tape applicator head 78 controlled by a robot 76. Mandrel 56 and end fittings 24 are supported on suitable rotisserie 70 which rotates 82 the mandrel 56 about a central axis 80. The plies 48 may include unidirectional fiber reinforcement having varying fiber orientations according to a predetermined ply schedule, including but not limited to 0, +30, +45, 90, −60, −45, and −30 degrees, or other fiber orientations. As previously mentioned, other types of automated layup processes may be employed to layup the stiffeners 52, 54 and/or the plies of the tube wall 50, including without limitation, filament winding and fabric layup.

Figure 16:
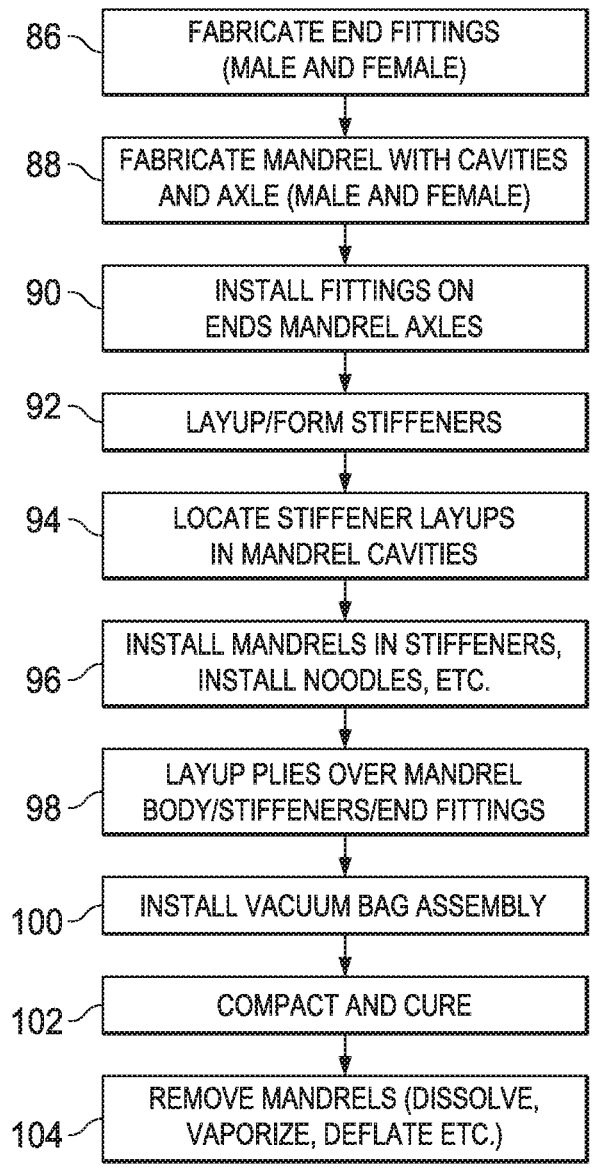
FIG. 16 is an illustration of a flow diagram of a method of making a composite strut according to the disclosed embodiments.

FIG. 16 summarizes the overall steps of the method previously described for fabricating the strut 20. Beginning at 86, the end fittings 24 are fabricated using suitable casting, and molding and/or machining techniques. At 88, the mandrel 56 is formed which includes forming or assembling the mandrel body 57, cavities 60, 62 and axles 64. At 90, the end fittings 24 are installed on the axles 64 of the mandrel 56. At 92, stiffeners 52, 54 are laid up and formed using separate tooling. Alternately, the stiffeners 52, 54 may be directly laid up within the cavities 60, 62 using an AFP machine. In those embodiments where the stiffeners 52, 54 are individually laid up and formed in separate tooling, they are then located within the mandrel cavities 60, 62 at step 94. At step 96, stiffener mandrels 84 are installed within the stiffener layups 52, 54 along with additional elements such as noodles or other fillers, as required. At step 98, the plies 48 of the tube wall 50 are laid up over the mandrel body 57, covering the stiffener layups 52, 54 and the scalloped section 40 of the end fittings 24. At 100, a vacuum bag assembly (not shown) is installed around the strut layup. At 102, the strut layup is compacted and cured using an autoclave or other processes which apply heat and pressure to the layup. Finally, at 104, the mandrels 56, 84 are removed. In the embodiment where the mandrels 56, 84 are formed from a water soluble material, the water may be injected into one end or both ends of the through hole 68, resulting in the mandrels 56, 84 being dissolved and flushed out through the through hole 68.

Figure 17:
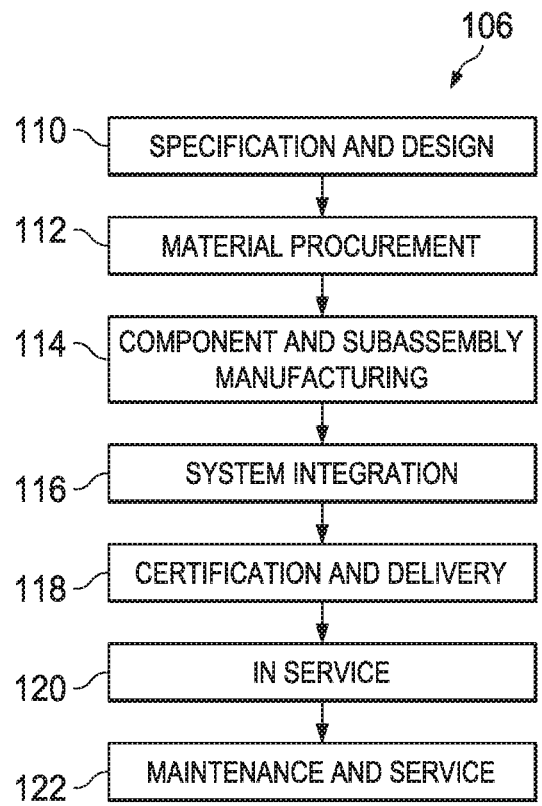
FIG. 17 is an illustration of a flow diagram of aircraft production and service methodology.
Figure 18:
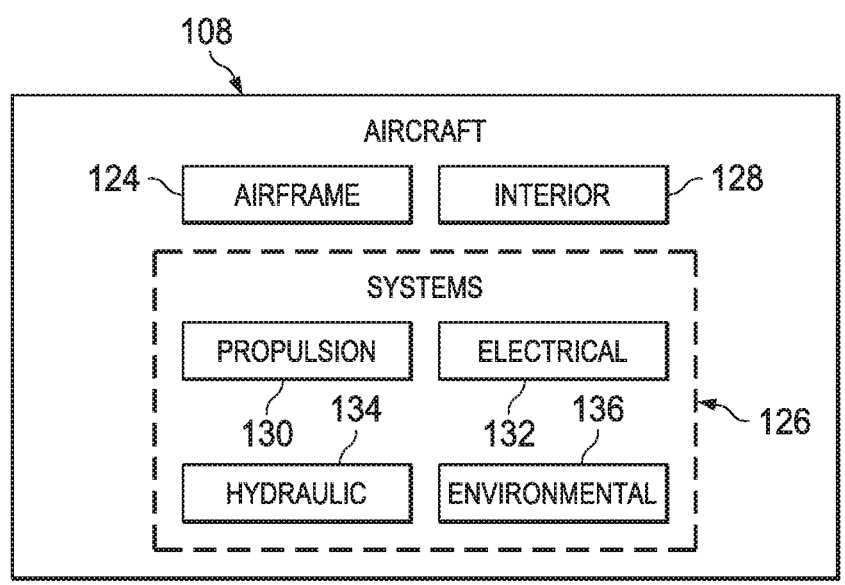
FIG. 18 is an illustration of a block diagram of an aircraft.

Embodiments of the disclosure may be employed, without limitation, in the context of aircraft manufacturing and service method 106 as shown in FIG. 17 and an aircraft 108 as shown in FIG. 18. During pre-production, aircraft manufacturing and service method 106 may include specification and design 110 of aircraft 108 in FIG. 18 and material procurement 112.

During production, component and subassembly manufacturing 114 and system integration 116 of aircraft 108 in FIG. 18 takes place. Thereafter, aircraft 108 in FIG. 18 may go through certification and delivery 118 in order to be placed in service 120.

While in service 120 by a customer, aircraft 108 in FIG. 18 is scheduled for routine maintenance and service 122, which may include modification, reconfiguration, refurbishment, and other maintenance or service.

Each of the processes of aircraft manufacturing and service method 106 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft 108 is depicted in which an advantageous embodiment may be implemented. In this example, aircraft 108 is produced by aircraft manufacturing and service method 106 in FIG. 17 and may include airframe 124 with plurality of systems 126 and interior 128. The disclosed mandrel may be used to fabricate various structural components of the airframe 124, such as stringers. Examples of systems 126 include one or more of propulsion system 130, electrical system 132, hydraulic system 134, and environmental system 136. Any number of other systems may be included. Although an aircraft example is shown, different advantageous embodiments may be applied to other industries, such as the automotive and marine industries.

Apparatuses and methods embodied herein may be employed during at least one of the stages of aircraft manufacturing and service method 106 in FIG. 17. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 114 in FIG. 17 may be fabricated or manufactured in a manner similar to components or subassemblies produced while aircraft 108 is in service 120 in FIG. 17. As yet another example, a number of apparatus embodiments, method embodiments, or a combination thereof may be utilized during production stages, such as component and subassembly manufacturing 114 and system integration 116 in FIG. 17. A number, when referring to items, means one or more items. For example, a number of apparatus embodiments is one or more apparatus embodiments. A number of apparatus embodiments, method embodiments, or a combination thereof may be utilized while aircraft 108 is in service 120 and/or during maintenance and service 122 in FIG. 17. The use of a number of the different advantageous embodiments may substantially expedite the assembly of and/or reduce the cost of aircraft 108.

Turning now to FIGS. 19-22, several different cross-sectional views of different composite struts are depicted in accordance with illustrative embodiments. The tube 22 may be internally stiffened by two pairs of elongate composite stiffeners 52, 54, respectively. The first pair of stiffeners 52 are located diametrically opposite each other on the interior surface 47 of the tube wall 50, and are generally symmetrically aligned along axis 25 extending substantially orthogonal to the axis 27 of the pin 30 (not depicted). The second pair of stiffeners 54 are also located diametrically opposite each other, and generally symmetrically aligned along the axis 27 of the pin 30. In some illustrative examples, tube 22 may have a pair of stiffeners which are diametrically opposed to each other but are not symmetrically aligned along either axis 25 or axis 27. The elongate composite stiffeners 52, 54 may be formed of a number of plies. As used herein, "a number of," when used with reference to items means one or more items. Thus, each of stiffeners 52, 54 may be formed of one or more plies. In one illustrative example, stiffeners 52, 54 may each be formed of about 3 plies to about 6 plies. In other illustrative examples, stiffeners 52, 54 may each be formed of more than 6 plies. In yet other illustrative examples, stiffeners 52, 54 may each be formed of less than 6 plies.

Figure 19:
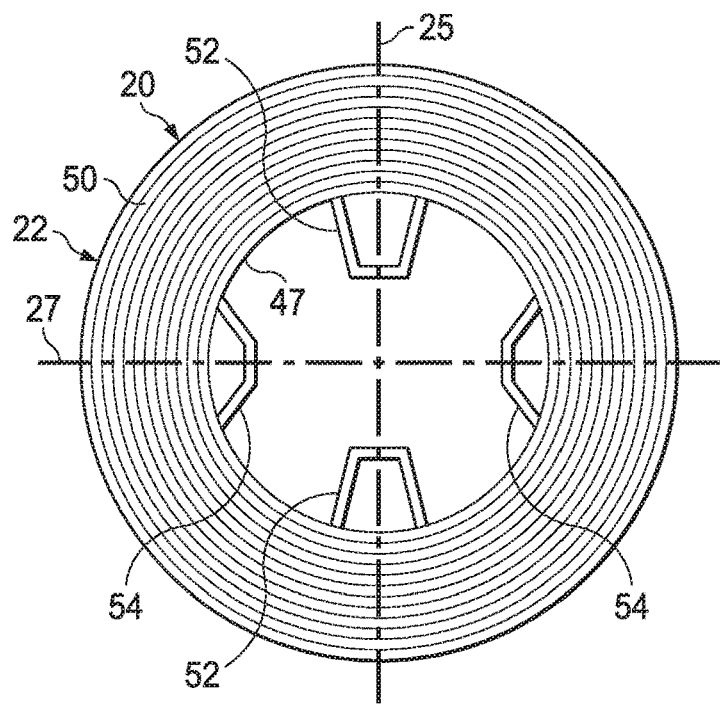
FIG. 19 is an illustration of a cross-sectional view of a composite strut according to the disclosed embodiments.
Figure 20:
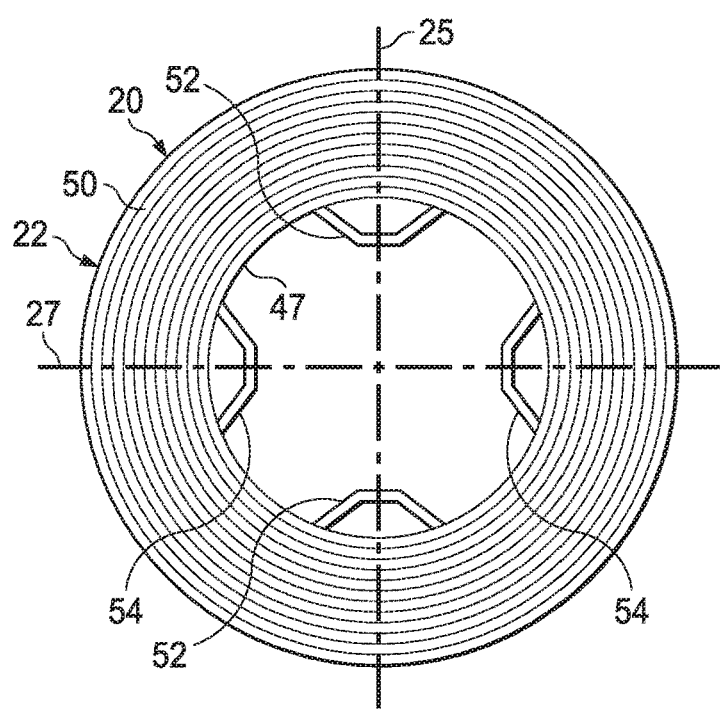
FIG. 20 is an illustration of a cross-sectional view of a composite strut according to the disclosed embodiments.
Figure 21:
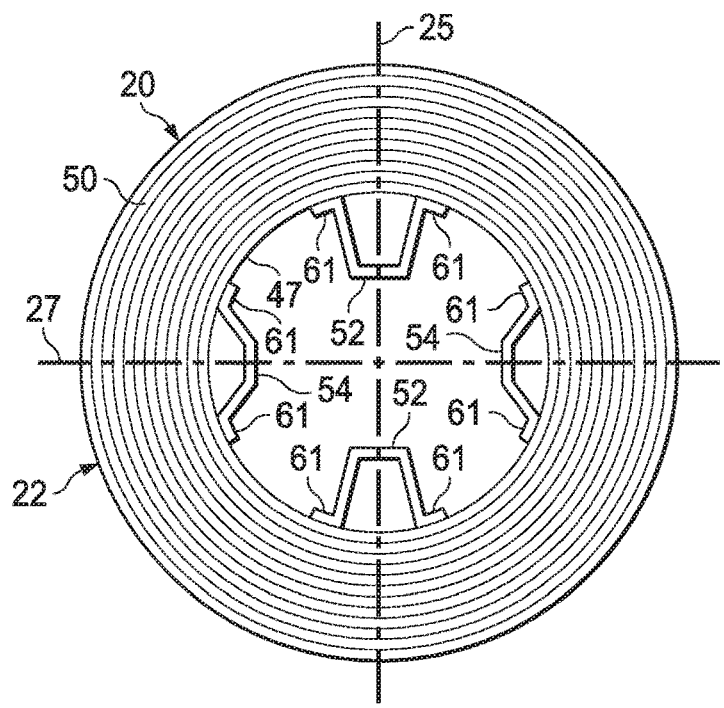
FIG. 21 is an illustration of a cross-sectional view of a composite strut according to the disclosed embodiments.
Figure 22:
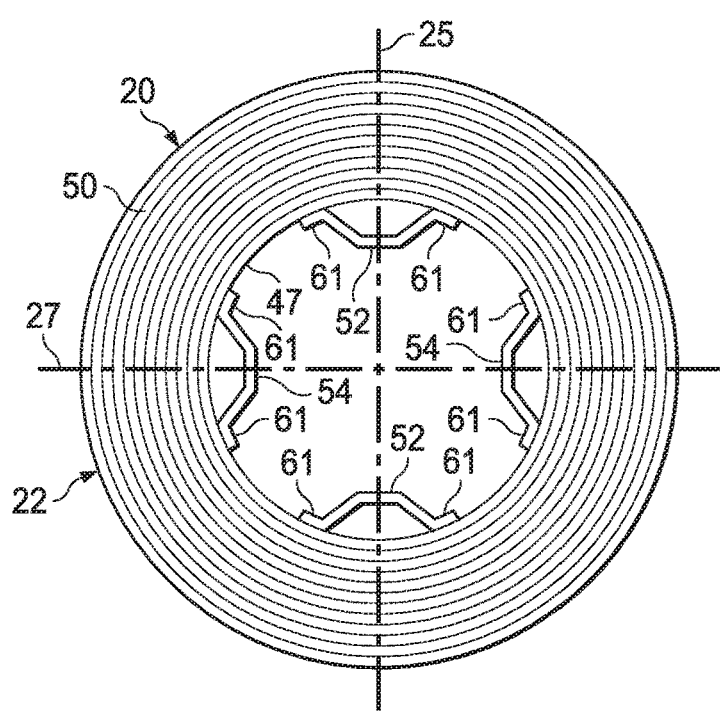
FIG. 22 is an illustration of a cross-sectional view of a composite strut according to the disclosed embodiments.

In the illustrated examples, each of the stiffeners 52, 54 is substantially trapezoidal in cross sectional shape, however other cross sectional shapes are possible. As shown in FIG. 19 and FIG. 21, each of the stiffeners 52 may have a larger cross sectional area than stiffeners 54 in order to provide the tube 22 with greater resistance to bending about the pin axes 27. As shown in FIG. 20 and FIG. 22, each of the stiffeners 52 and stiffeners 54 may have substantially the same cross sectional area. As depicted in FIG. 21 and FIG. 22, the stiffeners 52, 54 may include integrated lateral flanges 61. Integrated lateral flanges 61 may provide a greater surface area for bonding the stiffeners 52, 54 to the tube 22.

In one embodiment, one or both of the stiffeners 52, 54 in FIGS. 19-22 may have a cross sectional shape that is substantially constant along the length of the stiffener 52, 54. However, in other embodiments, the cross section of any of any of the stiffeners 52, 54 may vary in shape or area, either linearly or non-linearly along the length of the stiffener 52, 54. In some embodiments, the number of plies of any of the stiffeners 52, 54 may vary along the length of the stiffener 52, 54. For example, there may be ply drops or ply additions in any of the stiffeners 52, 54 along the length of the stiffener 52, 54 in some illustrative embodiments. In some embodiments, the stiffeners 52, 54 may be bonded to the tube 22 after the tube 22 is cured. In some other embodiments, the stiffeners 52, 54 may be bonded to the tube 22 at substantially the same time as when the tube 22 is cured.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a strut, comprising:
   locating composite stiffener layups on an elongate mandrel;
   forming a composite tube by laying up composite plies on the elongate mandrel overlying the composite stiffener layups, wherein the composite stiffener layups are positioned at diametrically opposite locations on the composite tube and wherein a first pair of diametrically opposite composite stiffener layups is symmetrically aligned along a first axis and a second pair of diametrically opposite composite stiffener layups is symmetrically aligned along a second axis orthogonal to the first axis, and wherein the first pair of diametrically opposite composite stiffener layups has a larger cross sectional area than the second pair of diametrically opposite composite stiffener layups;
   cocuring the composite tube and the composite stiffener layups; and
   removing the elongate mandrel.

2. The method of claim 1, further comprising:
   fabricating the elongate mandrel.

3. The method of claim 1, further comprising:
   placing a fitting on each end of the elongate mandrel.

4. The method of claim 3, wherein forming the composite tube includes forming a single shear joint between the composite tube and each fitting.

5. The method of claim 1, further comprising:
   forming an axle on each end of the elongate mandrel;
   forming cavities in the elongate mandrel along its length; and
   placing a respective fitting on each axle of the elongate mandrel.

6. The method of claim 1, wherein locating the composite stiffener layups on the elongate mandrel includes:
   laying up and forming the composite stiffener layups to create formed stiffener layups; and
   placing the formed stiffener layups in cavities in the elongate mandrel.

7. The method of claim 1, wherein forming the composite tube is performed using an automated fiber placement machine to laydown and compact strips of composite tape on a surface of the elongate mandrel.

8. The method of claim 1, wherein locating the composite stiffener layups on the elongate mandrel includes using an automated fiber placement machine to laydown and compact strips of composite tape within cavities of the elongate mandrel.

9. The method of claim 1, wherein removing the elongate mandrel includes dissolving the elongate mandrel with a liquid.

10. The method of claim 1, further comprising:
    inserting stiffener mandrels within the composite stiffener layups; and
    removing the stiffener mandrels after the composite tube and the composite stiffener layups have been cocured.

11. The method of claim 10, wherein inserting stiffener mandrels within the composite stiffener layups comprises placing the stiffener mandrels longitudinally within the composite tube at the diametrically opposite locations on the composite tube.

12. The method of claim 1, wherein locating composite stiffener layups on an elongate mandrel comprises locating a plurality of composite stiffener layups in cavities of the elongate mandrel, each composite stiffener of the plurality of composite stiffener layups having a cross sectional shape corresponding to the cross sectional shape of the cavities of the elongate mandrel.

13. A method of making a strut for aircraft applications, comprising:
    fabricating an elongate mandrel, including;
    sleeving metal end fittings over axles of the elongate mandrel;
    locating a plurality of composite stiffener layups in cavities of the elongate mandrel, each composite stiffener layup of the plurality of composite stiffener layups having a cross sectional shape corresponding to the cross sectional shape of the cavities of the elongate mandrel;
    placing stiffener mandrels in the plurality of composite stiffener layups;

forming a composite tube by laying up composite plies on the elongate mandrel overlying the plurality of composite stiffener layups, the metal end fittings, and the stiffener mandrels, wherein pairs of composite stiffener layups are positioned at diametrically opposite locations on the composite tube and wherein a first pair of diametrically opposite composite stiffener layups is symmetrically aligned along a first axis and a second pair of diametrically opposite composite stiffener layups is symmetrically aligned along a second axis orthogonal to the first axis, and wherein the first pair of diametrically opposite composite stiffener layups has a larger cross sectional area than the second pair of diametrically opposite composite stiffener layups;

cocuring the composite tube and the plurality of composite stiffener layups; and removing the stiffener mandrels and the elongate mandrel.

14. The method of claim 13, wherein sleeving metal end fittings over the axles of the elongate mandrel comprises placing a respective fitting on a respective axle on each end of the elongate mandrel.

15. The method of claim 13, wherein forming the composite tube is performed using an automated fiber placement machine to laydown and compact strips of composite tape on a surface of the elongate mandrel.

16. The method of claim 13, wherein locating the plurality of composite stiffener layups in cavities in the elongate mandrel comprises placing the plurality of composite stiffener layups longitudinally within the composite tube at the diametrically opposite locations on the composite tube.

17. The method of claim 16, wherein each of the plurality of composite stiffener layups is trapezoidal in cross sectional shape.

18. The method of claim 16, wherein each of the plurality of composite stiffener layups is substantially hollow.

19. The method of claim 13, wherein removing the stiffener mandrels and the elongate mandrel comprises dissolving the stiffener mandrels and the elongate mandrel with a liquid.

20. The method of claim 13, wherein placing stiffener mandrels within the plurality of composite stiffener layups comprises placing the stiffener mandrels longitudinally within the plurality of composite stiffener layups at the diametrically opposite locations on the composite tube.

21. The method of claim 13, wherein forming the composite tube includes forming a single shear joint between the composite tube and each metal end fitting.

* * * * *